United States Patent

Williams

[11] Patent Number: 5,940,403
[45] Date of Patent: Aug. 17, 1999

[54] QUARTER-RATE 2B1Q ISDN ARCHITECTURE WITH EMBEDDED DIFFERENTIAL DELAY COMPENSATION FOR EXTENDING RANGE OF DDS COMMUNICATIONS

[75] Inventor: Philip David Williams, Madison, Ala.

[73] Assignee: Adtran, Inc., Huntsville, Ala.

[21] Appl. No.: 08/744,975

[22] Filed: Nov. 7, 1996

[51] Int. Cl.⁶ ........................................... H04J 3/16
[52] U.S. Cl. .................. 370/465; 370/274; 370/492; 370/501; 370/536
[58] Field of Search ........................ 370/465, 473, 370/480, 484, 496, 516, 519, 536, 542, 545, 468, 315, 492, 274, 501

[56] References Cited

U.S. PATENT DOCUMENTS

| | | | |
|---|---|---|---|
| 4,577,312 | 3/1986 | Nash | 370/79 |
| 4,630,286 | 12/1986 | Betts | 375/39 |
| 4,775,987 | 10/1988 | Miller | 375/38 |
| 4,803,705 | 2/1989 | Gillingham et al. | 370/516 |
| 5,119,402 | 6/1992 | Ginzburg et al. | 375/17 |
| 5,247,546 | 9/1993 | Abbiate et al. | 370/465 |
| 5,251,210 | 10/1993 | Mann et al. | 370/84 |
| 5,546,401 | 8/1996 | Lee et al. | |
| 5,598,413 | 1/1997 | Sansom et al. | 370/468 |
| 5,659,684 | 8/1997 | Giovannoni et al. | 370/465 |
| 5,680,400 | 10/1997 | York | 370/473 |
| 5,712,854 | 1/1998 | Dieudonne et al. | 370/536 |
| 5,719,747 | 2/1998 | Kashiwada | 361/760 |

Primary Examiner—Douglas W. Olms
Assistant Examiner—Shick Hom
Attorney, Agent, or Firm—Charles E. Wands

[57] ABSTRACT

The transmission distance for DDS subscriber lines over a repeaterless four-wire link is extended to customer premises beyond the standard four-wire loop range of approximately 18 kft (56 kbps, 56 kbps with secondary channel capability, and 64 kbps) by employing commercially available ISDN transceiver chip hardware to multiplex a DDS data channel into quarter-rate (2B1Q) ISDN channels. At least one of a signalling channel and an out-of-band maintenance channel is used to convey differential delay compensation information, without modifying the framing structure of the transported channels, or requiring additional bandwidth for a separate framing channel.

22 Claims, 2 Drawing Sheets

OFFICE CHANNEL UNIT DATA PORT (OCU DP)
WEST END SITE W

DDS TERMINATING UNIT
EAST END SITE E

QUARTER-RATE 2B1Q ISDN ARCHITECTURE WITH EMBEDDED DIFFERENTIAL DELAY COMPENSATION FOR EXTENDING RANGE OF DDS COMMUNICATIONS

FIELD OF THE INVENTION

The present invention relates in general to communication systems, and is particularly directed to the use of demultiplexed quarter-rate, integrated services digital network (ISDN) channels, to extend the operating range of four-wire, Dataphone Digital Service (DDS) subscriber lines to distances (on the order of 35 kft) well beyond distances currently possible at T-carrier time slot channel data rates (56 kbps and 64 kbps).

BACKGROUND OF THE INVENTION

Co-pending U.S. patent application Ser. No. 08/500,441, filed Jul. 10, 1995, now U.S. Pat. No. 5,598,413 issued Jan. 28, 1997, entitled: "FOUR WIRE, HALF-RATE ARCHITECTURE WITH EMBEDDED DIFFERENTIAL DELAY COMPENSATION FOR EXTENDING RANGE OF BASIC RATE ISDN COMMUNICATIONS," by M. Sansom et al, assigned to the assignee of the present application and the disclosure of which is herein incorporated (hereinafter referred to as the '441 application), describes a one-half rate ISDN demultiplexing—multiplexing architecture for solving a communication range extension problem resulting from an American National Standards Institute (ANSI) standard T1.601 governing ISDN communications.

In particular, ANSI standard T1.601 for 2B1Q modulation, two-wire, full-duplex data transfer with echo cancellation requires that currently installed ISDN basic rate digital subscriber lines (having a data rate of 144 kbps, with bidirectional data payload, plus overhead maintenance channels) must not exceed a two-wire loop loss of 42 dB at 40 kHz, or 1300 ohms, resistive. Such a requirement effectively limits the operational range of such a two-wire loop to approximately 15.2 kft, using No. 26 (American Wire Gauge) wire, and commercially available ISDN transceiver equipment. Extending ISDN communications to customers geographically located beyond this range requires that the service provider either install repeaters in the loop, or use a different communication medium, such as a T1 carrier fiber optic link, with both solutions being unattractive from a standpoint of cost, installation and maintenance.

In accordance with the invention described in the '441 application, this problem is solved by an ISDN communications architecture employing a pair of demultiplexed half-rate, integrated services digital network (ISDN) channels, having an out-of-band maintenance channel for conveying differential delay compensation information, to extend the normal range of ISDN basic rate digital subscriber lines to distances (on the order of 25 kft) well beyond those currently possible (typically 15.2 kft) using a repeaterless two-wire transmission path.

A problem similar to that described above for ISDN basic rate digital subscriber lines is encountered in (four-wire) DDS communications. In particular, if a telecommunications loop is to be a candidate for DDS assignment, it must comply with AT&T Technical Reference Publication No. 62310, which requires that the measured insertion loss in one direction between an Office Channel Unit Data Port (OCU DP) and the customer premises point of demarcation be less than 34 dB, when measured at the Nyquist frequency (½ the data rate for alternate mark inversion (AMI) circuits) and terminated by a 135 ohm impedance. This equates to approximately 21 kft of 24 AWG (American Wire Gauge) copper wire, or 18 kft of mixed gauge 26 and 24 AWG copper wire.

Although many OCU DP units can accommodate 45 dB of signal loss over copper wire loops, the requirement for the customer-owned equipment in terms of receiver sensitivity is only 38 dB, so that extending DDS communications to customers premises located beyond the 34 dB range requires that the service provider install either a loop repeater or a T1 Digital Loop Carrier system, each of which entails a substantial cost and installation penalty, as described above.

DDS loop repeaters are currently deployed on circuits operating at data rates of 56 kbps, 56 kbps with secondary channel, and 64 kbps. The effective communication range of circuits operating at data rates below 56 kbps can be extended to greater distances and therefore seldom require the use of a DDS repeater. A DDS repeater is powered from the loop and requires specially equipped OCU DP units or additional line powering modules, as well as a repeater housing or environmentally hardened case that can be mounted on a pole or within a subterranean enclosure.

In addition to the expense and time associated with the installation of the repeater and associated components is the expense incurred in the course of periodic maintenance of the repeater enclosure. While Digital Loop Carrier (DLC) systems offer a favorable solution to the dilemmas posed in DDS range extension when available, their cost cannot be justified on an individual circuit basis, due to the considerable investment for the service provider in terms of cost and installation time.

SUMMARY OF THE INVENTION

In accordance with the present invention, the desire to extend DDS communications to customer premises beyond the presently allowable four-wire loop range of approximately 18 kft (56 kbps, 56 kbps with secondary channel capability, and 64 kbps) using a mixed 24 and 26 AWG copper wire loop, without the cost penalty of the alternatives described above, is successfully addressed by employing commercially available ISDN transceiver chip hardware to demultiplex quarter-rate (2B1Q) ISDN channels for transport of DDS data over the four-wire DDS transmission path between the OCU DP and a customer premises site.

By operating at a frequency that is one-quarter of the operating frequency associated with the ISDN transceivers, the reduced data rate of the four-wire system operates as a trade-off against loop loss, increasing the distance over which DDS may be provided without further stipulation or constraint upon the requirement of loops considered as DDS candidates in terms of loop loss and bridged tap.

In accordance with a preferred embodiment of the DDS architecture of the present invention, an 'upstream' OCU DP site is operative to demultiplex PCM data associated with alternate successive pairs of data bytes associated with a respective timeslot of a T-carrier system into two ISDN transceiver units, each of which is clocked at one-quarter the rate of basic ISDN signalling of 80 kHz. Quarter-rate ISDN bearer (B) channels of DDS data are transported over two, two-wire pairs that make up the four-wire transmission path to a pair of ISDN transceiver units at the 'downstream' termination unit installed at a customer premises site. The downstream termination unit multiplexes these quarter-rate ISDN channels back into a single data stream which is delivered to the customer as an alternate mark inversion (AMI) modulated signal.

Because the quarter-rate ISDN channels are demultiplexed onto separate physical two-wire communication paths, there will be a differential transport delay or offset between the two pairs of quarter-rate ISDN channels, which must be corrected to gain proper time alignment and ensure that data is multiplexed back into the original data stream.

This differential transport delay between the two pairs of quarter-rate ISDN channels is compensated by using an available overhead or auxiliary channel of an unused quarter-rate (4Kb/s) signalling (D) channel or an out-of-band (4Kb/s) maintenance channel to convey time of start and time of arrival measurement information to the opposite end of the four-wire link, and thereby enable supervisory communication control processors at one or both ends of the four-wire link to control the insertion of the requisite amount of delay in the faster of the two pairs of quarter-rate ISDN channels, achieving the necessary time alignment for multiplexing the quarter-rate ISDN channels back into a single data stream prior to AMI conversion for delivery to customer premises equipment.

The invention takes advantage of the communication signal processing functionality of the ISDN transceiver chips to pre-establish, at the OCU DP end of the four-wire link, a prescribed differential (lead time) offset between the superframe synchronization signal structure inherent in the operation of each transceiver chip for a first (or leading) of one pair of quarter-rate ISDN channels relative to the superframe synchronization signal structure for a second (or lagging) pair of quarter-rate ISDN channels.

In addition, an available (normally unused) portion of the out-of-band maintenance channel of the leading quarter-rate ISDN channel or signalling (D) channel may used to mark that channel as having its leading superframe synchronization structure started first, so that transceiver equipment at the downstream DDS termination unit will know which received pair of the quarter-rate ISDN channels contains a 'leading' channel, regardless of which two-wire pair has conveyed that quarter-rate ISDN channel. This 'marking' of such a leading channel allows the connections of the two twisted pairs to the transceiver units at the ends of the four-wire link to be physically reversed, without impairing the signal processing capabilities of the system.

At the downstream (termination unit) end of the four-wire link, the differential delay between the superframe boundaries of the two (leading and lagging) pairs of quarter-rate ISDN channels is measured and compared with the expected delay offset between the marked (leading) quarter-rate channel of one pair of ISDN channels, and an unmarked (lagging) quarter-rate ISDN channel of the other pair of ISDN channels. Knowing that the superframe synchronization signal structure of the marked (leading) quarter-rate ISDN channel was started first by its quarter-rate clocked transceiver at the OCU DP, and by a prescribed lead time relative to the lagging quarter-rate ISDN channels of the other pair, the difference in transport delay between the two pairs of quarter-rate ISDN channels is computed by the customer premises-associated DDS termination unit's communications control processor.

In accordance with a first embodiment of the invention, this computed delay is employed by the customer premises-associated DDS termination unit's processor to control the injection of the necessary delay offset (by way of delay circuitry contained in the multiplexer for combining the two pairs of received quarter-rate ISDN channels) into the faster pair of channels, thereby providing the required time alignment for recovering the DDS data stream.

In a second embodiment of the invention, rather than provide delay equalization in the multiplexer path within the DDS termination unit, the DDS termination unit's processor injects a received delay representative message into a signalling (D) channel portion or out-of-band embedded operations channel (EOC) or maintenance channel portion of one of the quarter-rate ISDN channels in the return path (from the DDS termination unit back to the OCU DP). This delay offset message in the return channel is used by the OCU DP's communications control processor to control the injection of the insertion of a prescribed delay into the faster pair of quarter-rate ISDN channels demultiplexed at the OCU DP, thereby providing pre-transmission time alignment that will allow the multiplexer in the downstream DDS termination unit to recover the data stream. Thus, signal processing hardware at the DDS termination unit is simplified by performing all delay equalization at the OCU DP.

For the quarter-rate ISDN channels in the return direction, since the superframes are defined by the downstream superframe boundaries inherent in the received quarter-rate ISDN channels, it is not possible to use the quarter-rate transceiver chips in the DDS termination unit to invoke a prescribed (leading and lagging) offset between the superframe structures of the respective return quarter-rate channels as carried out in the OCU DP, as described above.

This is circumvented by measuring the actual offset between the superframe boundaries of the return channels, and then incorporating a return channel framing message representative of the relative delay between the framing structures of the return quarter-rate channels into a usurped portion of an out-of-band maintenance channel or signalling (D) channel portion of one of the quarter-rate channels in the return path, similar to injection of the received delay representative message in a signalling or out-of-band maintenance channel portion of the one quarter-rate return channel.

At the OCU DP, similar to the framing delay measurement processing carried out at the DDS termination unit, the differential delay between the superframe structures of the two pairs of return quarter-rate ISDN channels is measured and compared with the measured framing transmission offset message in the out-of-band maintenance channel portion or the unused signalling channel portion of the one return path quarter-rate channel. Any difference between the two is employed to delay the faster pair of quarter-rate ISDN channels within the multiplexed digital signal path at the OCU DP, thereby correcting for the differential transmission path delay in the return direction.

DETAILED DESCRIPTION

Before describing in detail the delay offset-compensated, quarter-rate demultiplexed ISDN architecture of the present invention, that enables the range of four-wire DDS circuits to be extended well beyond normal two-wire loop length, it should be observed that the present invention resides primarily in what is effectively a prescribed set of conventional telecommunication signalling hardware components and attendant supervisory communications microprocessor circuitry therefor, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

In the description to follow, operating boundaries for the invention will be specified in terms of distance rather than loop loss. It will be understood that the technique herein described will support all data rates currently offered from 2.4–56 kbps, including secondary channel and 64 kbps, and the extended range capability of the present invention will embrace the distance demands of nearly all DDS circuits from 2.4–56 kbps, including secondary channel and 64 kbps.

Figure 1:
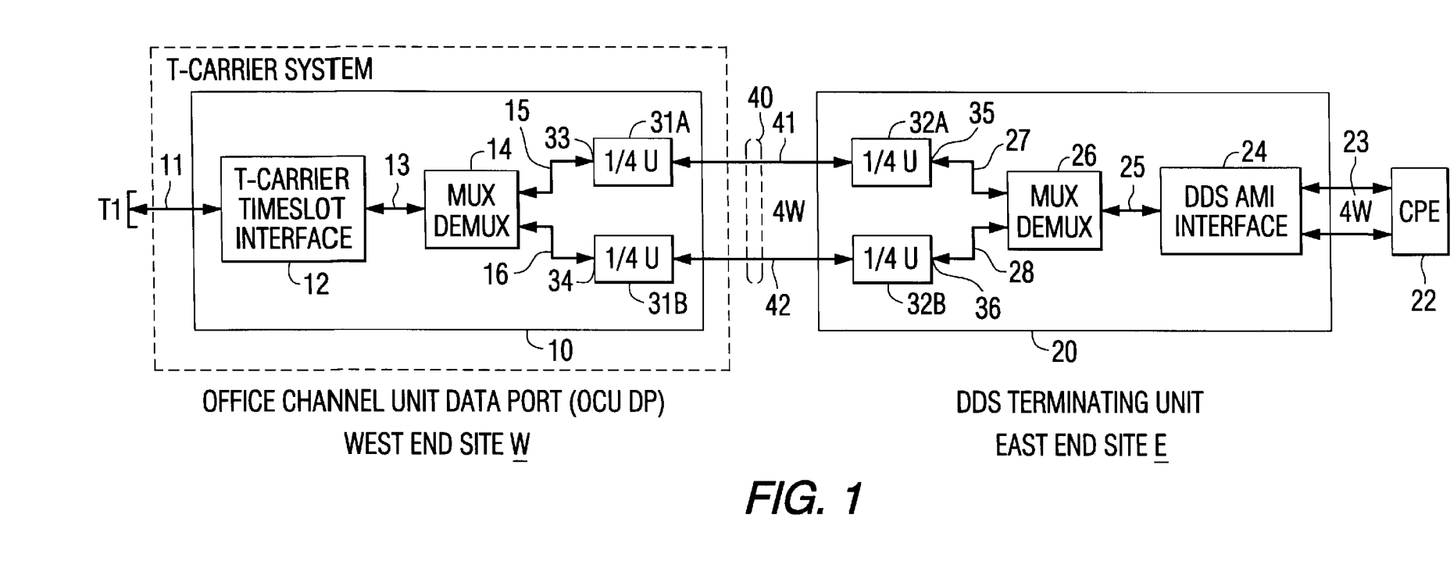
FIG. 1 diagrammatically illustrates the manner in which a DDS network architecture interconnecting an (OCU DP) station and a DDS termination unit station is modified in accordance with the present invention, to enable a customer premises-associated DDS termination unit to be located well beyond the customary maximum allowable length defined by ANSI performance standards.

Referring now to FIG. 1, a communication system for extending the range of (four-wire) DDS communications between a pair of geographically separated sites is diagrammatically illustrated as comprising an OCU DP 10 disposed at a 'west' end site W and a DDS termination unit 20 at an 'east' site E, to allow customer premises equipment 22 (coupled over a standard four-wire DDS link 23 to the DDS termination unit 20) to be located well beyond the present four-wire loop range of approximately 18 kft of 24 and 26 AWG, described above. As shown in FIG. 1, in place of conventional AMI modulation normally associated with DDS subscriber lines, respective pairs of quarter-rate ISDN transceiver units (U-chips) 31A and 31B installed in OCU DP 10 and transceiver units 32A and 32B of DDS termination unit 20 provide two separate full-duplex communication paths 41 and 42 between the two end sites of a four-wire (dual twisted pair) circuit 40 terminated by the west site W and the east site E. Each of transceiver units 31A, 31B, 32A and 32B preferably comprises a commercially available, basic rate ISDN transceiver U-chip.

By clocking the two pairs of ISDN transceiver units 31A, 31B and 32A, 32B at one-fourth the normal clock rate, the operating frequency for rates of 56 kbps and 64 kbps is reduced significantly and serves as a trade-off against loop loss, thus enabling the effective range of the four-wire DDS circuit to be geographically extended (up to a distance on the order of 35 kft), while complying with applicable industry standards for loop deployment and testing.

More particularly, at the OCU DP west site W, a T1 rate (1.544 Mb/s time division multiplexed (TDM) data stream of a T-carrier system is coupled over a TDM link 11 to timeslot interface circuitry 12 of the OCU DP 10. For a respective one of the twenty-four time slots of the T1 data stream, the timeslot interface circuitry 12 outputs digital data in the form of successive 64 kbps, eight bit bytes, via a line 13, to a bidirectional multiplexer—demultiplexer (mux/demux) unit 14. Mux/demux unit 14 demultiplexes the incoming 64 kbps data stream as alternating pairs of adjacent time slots or bytes, as diagrammatically illustrated in FIG. 2. These successive alternating byte pairs are applied over links 15 and 16 to digital communication ports 33 and 34 of first and second ISDN transceiver units 31A and 31B.

A standard full rate (160 kb/s) ISDN channel is comprised of two 64 kb/s bearer (B1, B2) channels, a 16 kb/s signalling (D) channel, and a 16 kb/s embedded operations channel (EOC) or maintenance (M) channel. For the two, two-wire pairs which make up four-wire link 40, each of ISDN transceiver units 31A and 31B is clocked at one-fourth (one-quarter) the standard ISDN basic rate frequency of 160 kHz, so as to output 40 kHz quarter-rate 2B1Q channels (denoted as ISDN channel 1 and ISDN channel 2). Thus, each quarter rate (40 kb/s) ISDN channel contains two 16 kb/s bearer (B1, B2) channels, a 4 kb/s signalling (D) channel, and a 4 kb/s embedded operations channel (EOC) or maintenance (M) channel. Respective pairs of these quarter-rate ISDN channels are transported between the transceiver units 31A and 31B of the OCU DP 10 over links 41 and 42 of four-wire link 40 to the two transceiver units 32A and 32B at the DDS termination unit 20 of customer premises (west) end site W.

In a complementary fashion, at the DDS termination site E serving the customer premises equipment 22, an industry standard DDS AMI four-wire interface 24 is coupled over line 25 to a bidirectional mux/demux unit 26, which outputs demultiplexed digital signals over lines 27 and 28 to digital communication ports 35 and 36 of first and second quarter-rate ISDN transceiver units 32A and 32B.

In operation, considering, for example, communication from the west end site W to the east end site E of the four-wire network, in the transmit direction, the T-carrier timeslot interface circuit 12 is operative to extract a respective channel of an incoming T-carrier format TDM data stream on link 11 into a 64 kbps data stream, which is demultiplexed by mux/demux 14 into a pair of 64 kbps channels. As described above with reference to FIG. 2, each output channel of mux/demux 14 contains alternating byte pairs of the incoming data stream, for application to respective ones of the quarter-rate clocked U-chip transceiver units 31A and 31B.

Each of transceiver units 31A and 31B outputs a pair of quarter-rate 2B1Q channels onto a respective one of the two-wire pairs 41 and 42 of the four-wire link 40, for transport to (the quarter-rate clocked) transceiver units 32A and 32b at the east end site E of the link 40. At the east site E, the received quarter-rate ISDN channels are multiplexed through mux/demux multiplexer 26 for application over link 25 to the DDS AMI interface circuit 24, which outputs a standard DDS AMI signal onto the four-wire link 23 for delivery to customer premises equipment 22.

As described briefly above, because the two pairs of quarter-rate ISDN channels transmitted by transceiver units 31A and 31B onto the two-wire pairs 41 and 42 are demultiplexed through separate communication paths, including the quarter-rate signal processing components of the interface units themselves and the separate two-wire pairs 41 and 42 between the OCU DP 10 at west site W and the DDS termination unit 20 at east site E, there will be a differential transmission delay between the two pairs of quarter-rate ISDN channels. This differential delay or offset must be corrected (either at the transmitter, the receiver, or both), in order for the two pairs of quarter-rate ISDN channels to be properly time aligned and recombined back into the original data stream.

As detailed in the '441 application, one prior art approach to solve the problem of differential delay in a sub-rate demultiplexed channel communication system is to make the data rate of each demultiplexed sub-rate channel slightly higher than a proportional fraction of the basic data rate, such as described in the U.S. Pat. No. to Castellano et al, No. 5,065,396, for example, and thereby provide additional bandwidth to accommodate a framing structure that contains channel steering and alignment information, similar to a packet switched network.

Unfortunately, this scheme suffers two shortcomings. First, to provide additional bandwidth for the control channel, the data rate of each sub-rate channel must be increased to a rate higher than a proportional fraction of the data rate associated with the number of demultiplexed channels. This complicates timing control of the transceiver components, and requires additional overhead circuitry for handling steering control and differential delays among the respective channels. Secondly, insertion of the control channel requires that the framing structure of the incoming data must be modified to conform with the steering control algorithm.

To obviate this problem, the present invention employs the technique described in the '441 application, in which an out-of-band maintenance channel or a signalling channel is used to transport invoked and measured superframe structure delay offset-representative control messages from one end of the four-wire link to the other. No separate sub-channel is required to convey differential delay compensation data, and the framing structure of the basic rate ISDN channel remains intact, so that the multiplexing—demultiplexing mechanism in each site is 'invisible' to the user.

Figure 3:
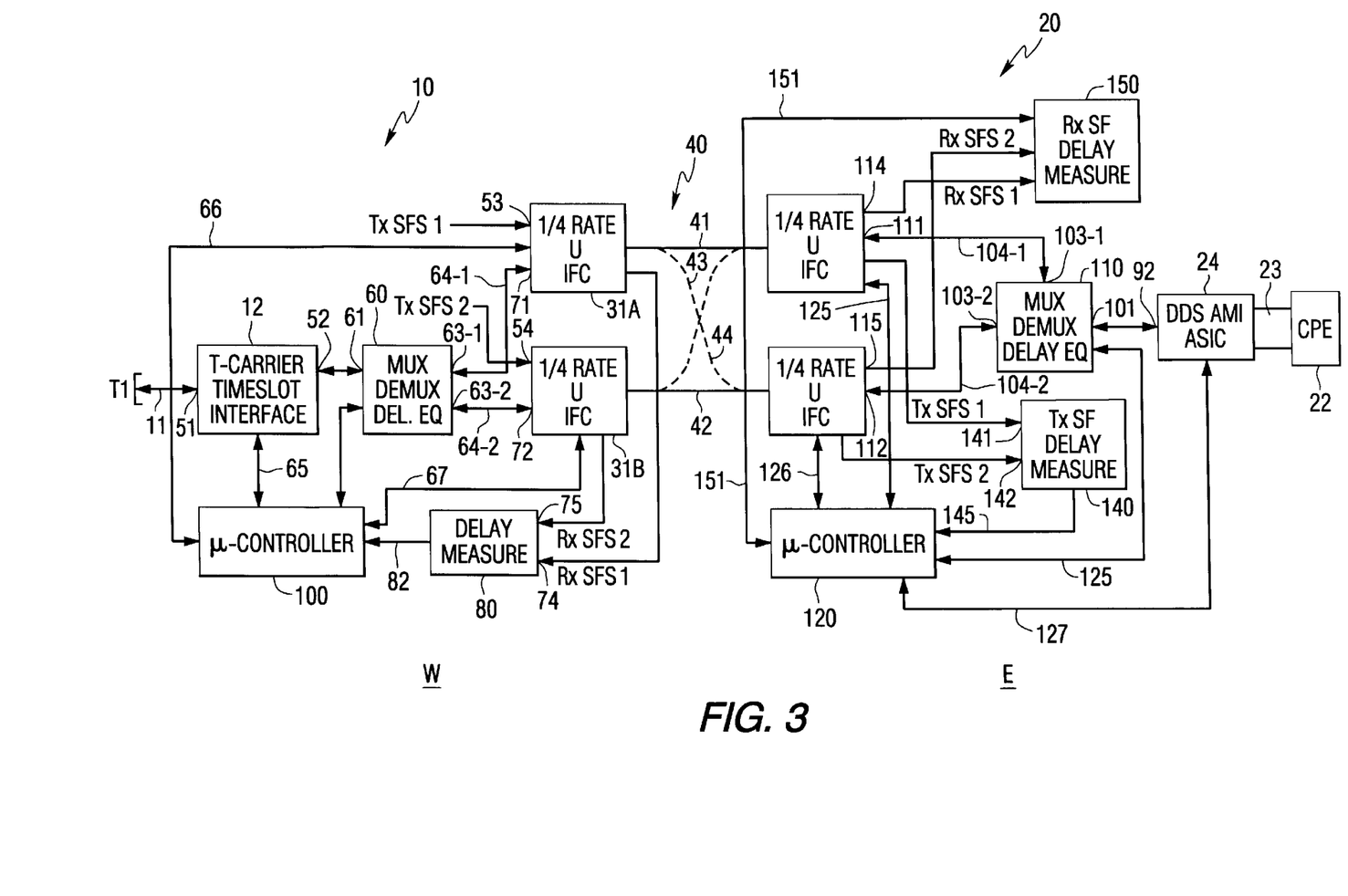
FIG. 3 diagrammatically illustrates the details of each of the OCU DP 10 and the DDS termination unit 20 of the four-wire extended range DDS communication system of FIG. 1.

The manner in which this differential delay compensation mechanism is incorporated into the architecture of FIG. 1 is diagrammatically illustrated in FIG. 3. Within the OCU DP 10 at the west end site W, the T-carrier timeslot interface unit 12 is shown as having a first bidirectional port 51, which interfaces a (1.544 Mb/s) T-carrier data stream with respect to the link 11 from the T carrier system, and a second bidirectional port 52 that interfaces 64 kbps data of a respective channel of the T1 data stream with a first bidirectional port 61 of a bidirectional multiplexer-demultiplexer (mux-demux) 60.

Mux-demux 60 is of conventional construction, employing delay circuitry in each of its respective bidirectional paths, so as to provide for the insertion of a controlled amount of delay in either or both paths, under the control of an attendant supervisory communications control microprocessor 100. Mux-demux 60 has second bidirectional ports 63-1, 63-2 coupled via bus links 64-1, 64-2 to data ports 71 and 72 of first and second quarter-rate ISDN transceiver units 31A and 31B, which, as noted earlier, are clocked at one-quarter the basic ISDN clock rate. T-carrier timeslot interface 12 and ISDN transceiver U-chips 31A and 31B are controlled via respective control links 65, 66, and 67 from control processor 100.

Each transceiver unit contains an internal multi-stage elastic buffer, the state of which is non-accessible and typically unknown upon power up and reset, so that it can be expected that serial data stream processed through each transceiver will have an intrinsic delay that is not a priori definable. Thus, in addition to the transport delay through each of two-wire links 41 and 42 between the OCU DP 11 at the west end site W and the DDS termination unit 20 at the east end site E, the transport delay for each quarter-rate ISDN channel will include the intrinsic delays through its associated quarter-rate transceiver chips at the transmit end and the receive end of four-wire path 40.

Therefore, in order to properly align the two pairs of quarter-rate ISDN channels for recovery at each end of the four-wire link 40, the total transport delay in the downstream direction, and the total transport delay in the upstream direction are measured. Due to intrinsic delays through the transceiver chips, the upstream transport delay can be expected to be different from that in the downstream direction.

As in the '441 application, the are a number of ways to measure the transport delay. In a first embodiment, using the present example for signals originated from the west end site W, and return channels from the east end site E, the delay circuitry of mux/demux 60 within the OCU DP 10 is controlled via a control link 62 from control processor 100, to insert a prescribed amount of delay in the faster pair of the two received quarter-rate ISDN channels to provide for time alignment. In a second embodiment, the mux/demux 60 in OCU DP 10 is controlled to insert a prescribed amount of delay in a selected one of the two pairs of outgoing (demultiplexed) quarter-rate ISDN channels to be transported from the OCU DP 10 at the west end site W to the DDS termination unit 20 at the east end site E.

For a transmission of a respective pair of 64 kbps 'downstream-directed' timeslot bytes extracted from T-carrier data stream applied via link 11 to OCU DP 10 for transmission to DDS termination unit 20, T-carrier timeslot interface unit 12 is clocked at 64 kHz, so as to output successive 64 kbps bearer channel bytes B1, B2, B3, . . . of a respective time slot. Each quarter-rate transceiver U-chip 31A and 31B is clocked at one-fourth the clock rate employed for basic rate ISDN channel signalling, as described above.

Figure 2:
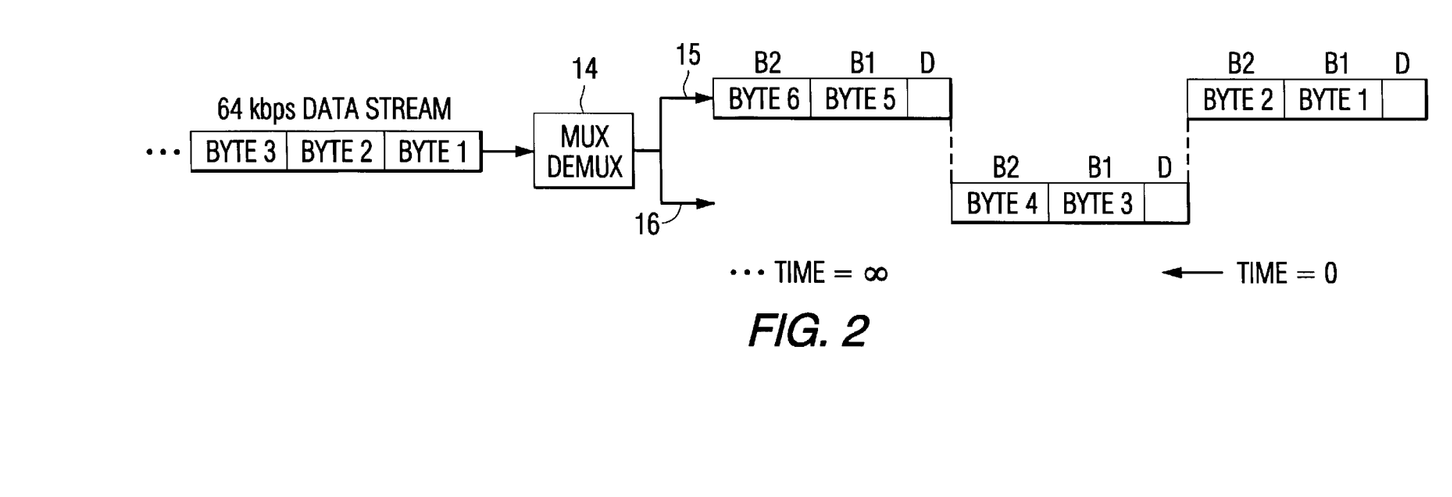
FIG. 2 diagrammatically illustrates the manner in which successive alternating byte pairs are demultiplexed for transport by ISDN transceiver U-chips over the four-wire extended range DDS communication system of FIG. 1.

As mux/demux 60 demultiplexes successive pairs of 64 kbps bytes applied to its first bidirectional port 61 from T-carrier interface unit 12, in the manner shown in FIG. 2, these pairs of 64 kbps bearer bytes (Bi, Bi+1 and Bi+2, Bi+3) of the TDM digital data stream for the time slot of interest are alternately clocked into transceiver units 31A and 31B and output therefrom as pairs of quarter-rate 2B1Q ISDN channels for transport over four wire pair 40 to DDS termination unit 20 at the east end site E.

As mentioned briefly above, within the transceiver equipment of the OCU DP 10 at west end site W, the present invention takes advantage of the communication signal processing functionality of the transceiver units 31A and 31B to pre-establish a prescribed differential (lead time) offset between the superframe synchronization signal structure inherent in the transceiver unit for a first 'leading' pair of the two pairs of quarter-rate ISDN channels relative to the superframe synchronization signal structure inherent in the transceiver unit for a second 'lagging' one of the two pairs of quarter-rate ISDN channels.

Transceiver units 31A and 31B have respective framing control ports 53 and 54, to which transmit superframe synchronization start signals Tx SFS1 and Tx SFS2 are applied by dedicated hardware circuitry for invoking the superframe structure inherent in the operation of the transceiver chips in the course of the transmission of outgoing pairs of quarter-rate 2B1Q ISDN channels on 41 and 42, respectively. In accordance with the delay compensation mechanism, control signals are applied to framing control ports 53 and 54 of transceiver units 31A and 31B. One of the transceiver units (e.g. transceiver unit 31A associated with the 'leading' quarter-rate channel) starts its respective transmit superframe structure a prescribed period of time in advance of enabling the other transceiver (e.g. transceiver unit 31B associated with 'lagging' quarter-rate channel) to start its transmit superframe structure. This prescribed relative delay or offset between the superframes for the two pairs of quarter-rate ISDN channels provides a known reference for measuring the amount of differential transmission path delay between the two pairs of quarter-rate ISDN channels at the downstream or DDS termination unit east end E of the four-wire link 40.

In addition, supervisory communications control processor 100 in OCU DP 10 at the west end site W uses an available (normally unused) signalling (D) channel portion or out-of-band maintenance channel (e.g. embedded operations channel, the M4 or the M56 channel) of a leading quarter-rate channel, to mark that channel as having its superframe synchronization structure started first. Alternatively, it may employ the signalling (D) channel, that would be normally be unused for DDS communications, for the transport of such time alignment information.

As a result, the transceiver equipment at the downstream DDS termination unit 20 at the east end site E will know which of the pairs of received two quarter-rate ISDN channels contains a 'leading' channel, regardless of which two-wire pair has conveyed that channel. This 'marking' of a leading ISDN channel allows the two, two-wire pairs 41, 42 that make up the four-wire link 40 to be physically swapped, as shown by broken lines 43 and 44, without impairing the signal processing capabilities of the system.

Transceiver units 31A and 31B further include received superframe synchronization signal ports 74 and 75, from which respective signals Rx SFS1 and Rx SFS 2, that mark the boundaries of received superframes in the quarter-rate ISDN channels transported from the other end of the link, are output to a frame sync signal delay measurement unit 80. Frame sync signal delay measurement unit 80 is operative to measure the differential delay between the superframe synchronization signals carried by the return quarter-rate ISDN channels. As will be described, this superframe offset derived by frame sync signal delay measurement unit 80 is coupled via link 82 to control processor 100, wherein it is compared with return channel framing delay information that has been inserted into the signalling or out-of-band maintenance channel portion of one of the return quarter-rate ISDN channels by return channel framing delay measurement circuitry at the DDS termination unit 20.

The return channel framing offset information carried by the signalling or out-of-band maintenance channel portion of one of the return quarter-rate channels is representative of the measured differential framing delay between the return quarter-rate channel superframes transported in the DDS termination unit to OCU DP return direction. By comparing the actual difference in the received superframe boundaries intrinsic to the quarter-rate return channels transmitted by the downstream quarter-rate transceiver units 32A and 32B at east end site E, as detected by frame sync signal delay measurement unit 80, with the differential framing boundary delay for the return quarter-rate channels, processor 100 determines which pair of quarter-rate return ISDN channels contains the faster channel. It also calculates the amount of equalization delay to be inserted into the faster ISDN channel pair that will achieve time alignment between the two pairs of return quarter-rate ISDN channels in the course of mux-demux 60 within OCU DP 10 multiplexing the two alternate byte pair data streams output by transceiver units 31A and 31B into a 64 kbps data stream for application over link 13 to port 52 of T-carrier timeslot interface 12.

Within the transceiver equipment at the DDS termination unit 20 at the east end site E, DDS AMI interface 24 has a pair of two-wire links that make up four-wire link 23 connected to customer premises equipment 22. DDS AMI interface 24 is implemented as an application specific integrated circuit and has a bidirectional digital data port 92, which interfaces digital signals with a first bidirectional port 101 of a mux-demux 110. Mux-demux 110, like mux-demux 60 of the OCU DP 10 at the west end site W, contains delay circuitry in each of its respective bidirectional channel paths, that provides for the insertion of a controlled amount of delay in either or both pairs of quarter-rate ISDN channels, under the control of an attendant microprocessor 120.

Mux-demux 110 has second bidirectional ports 103-1, 103-2 through which digital signals are coupled via bus links 104-1, 104-2 to and from data ports 111 and 112 of first and second quarter-rate ISDN transceivers units 32A and 32B. ISDN transceiver units 32A and 32B are identical to ISDN transceiver units 31A and 31B of the OCU DP 10 at the west end site W, being clocked at only one-quarter of the basic ISDN clock rate. Quarter-rate transceiver units 32A and 32B and DDS AMI interface unit 24 are controlled via control links 125, 126, and 127 from communications control processor 120.

In order to measure the offset between the superframe boundaries of the two pairs of (leading and lagging) quarter-rate ISDN channels transmitted from the OCU DP 10 at the west end site W, quarter-rate transceiver units 32A and 32B include respective received superframe synchronization signal ports 114 and 115, from which received superframe boundary signals Rx SFS1 and Rx SFS 2 are output to a frame sync signal delay measurement unit 150. As in the case of the OCU DP 10 at west end site W, signals Rx SFS1 and Rx SFS 2 are used to mark boundaries of the received superframes in the downstream directed quarter-rate channels from the OCU DP 10. Namely, frame sync signal delay measurement unit 150 measures the differential offset between the superframe synchronization signals carried by the received quarter-rate channels and couples this measured differential offset via link 151 to communications control processor 120.

As described previously, also transported in the available (normally unused) signalling channel or out-of-band maintenance channel portion of a leading quarter-rate ISDN channel (channel 1 in the present example) received from the OCU DP 10 at the west end site W is a code which marks that channel as having its superframe synchronization structure started first, so that communications control processor 120 within DDS termination unit 20 will know which quarter-rate ISDN channel is the 'leading' channel, regardless of which two-wire pair 41, 42 has conveyed that channel.

Communications control processor 120 compares the measured differential on link 151 from frame sync signal delay measurement unit 150 with the prescribed period of time (one 250 microsecond framing interval), by which the leading or marked superframe quarter-rate ISDN channel has been started in advance of a 'lagging' quarter-rate ISDN channel pair, and computes the difference in transport delay differential between the two pairs of downstream-directed quarter-rate ISDN channels. Using this computed transport delay, via link 125, processor 120 controls mux-demux 110 to inject an adjustable delay offset into the faster pair of the two received quarter-rate ISDN channels, thereby providing the required time alignment for recovering the 64 kbps data stream.

As noted above, in accordance with a second embodiment of the delay compensation mechanism, rather than use multiplexer 110 to provide delay equalization in the received signal path, communications control processor 120 generates a downlink transport delay equalization message representative of the computed transport delay by comparing the measured differential on link 151 from frame sync signal delay measurement unit 150 with the prescribed period of time (one 250 microsecond framing interval), by which a leading or marked superframe quarter-rate ISDN channel has been started in advance of a 'lagging' quarter-rate channel. The downlink transport delay equalization message is inserted into the out-of-band maintenance or a signalling (D) channel portion of one of the return path quarter-rate ISDN channels.

This transport delay message in the selected return ISDN channel is used by the OCU DP's communications control processor 100 to control mux-demux 60, so as to insert delay into the faster pair of quarter-rate ISDN channels demultiplexed and transmitted at the west end site W. thereby providing pre-transmission time alignment that will allow the multiplexer 110 in the DDS termination unit 20 to recover the 64 kbps data stream. This use of the out-of-band maintenance channel or an unused signalling (D) channel in a return ISDN channel for conveying both a superframe boundary offset message, to be described, and the transport delay offset message, allows all delay equalization to be performed in the OCU DP 10.

As described previously, in the course of transmitting quarter-rate ISDN channels in the return direction from the DDS termination unit 20 back to the OCU DP 10, since the return direction superframes are defined by the downstream superframe boundaries inherent in the received quarter-rate ISDN channels, it is not possible to use the quarter-rate transceiver units 32A and 32B in the DDS termination unit 20 to invoke a prescribed start time (leading and lagging) offset between the superframe structures of the respective return quarter-rate ISDN channels, as is carried out in the OCU DP 10. Instead, the actual offset between the transmitted superframe boundaries is measured by means a frame sync signal transmit offset measurement unit 140, which is coupled to the respective transmit framing control ports 141 and 142 of transceiver units 32A and 32B, from which the transmit superframe synchronization signals Tx SFS1 and Tx SFS 2 are derived.

The frame sync signal transmit time measurement unit 140 measures the differential delay between the superframe structures of the return quarter-rate channels and couples this transmission delay measurement via link 145 to communication control processor 120, which inserts a return channel framing boundary message into a signalling channel portion or out-of-band maintenance channel portion of a return quarter-rate ISDN channel. In the OCU DP 10 at the west end site W, this return channel differential framing boundary message in the out-of-band maintenance or signalling (D) channel portion of the selected return ISDN channel is compared by the control processor 100 with the framing boundary differential measured by the frame sync signal delay measurement unit 80.

By comparing the actual difference in framing boundaries delays for the two pairs of quarter-rate return ISDN channels, as detected by the frame sync signal delay measurement unit 80, with the differential framing boundaries for the return quarter-rate channels conveyed in the overhead portion of the return ISDN channel, processor 100 determines which of the two pairs of quarter-rate return ISDN channels is the faster channel pair, and the amount of delay in the slower channel pair required to be imparted by mux-demux 60, in order to delay the faster pair of quarter-rate return ISDN channels, and achieve time alignment between the two pairs of return quarter-rate ISDN channels in the course of multiplexing the pairs of data bytes back into a continuous 64 kbps data stream for application to T-carrier time slot interface unit 12.

As will be appreciated from the foregoing description, the use of demultiplexed quarter-rate, integrated services digital network (ISDN) channels makes it possible to extend the operating range of a repeaterless, four-wire DDS subscriber lines to distances on the order of 35 kft, that are well beyond distances currently possible at data rates of 56 kbps and 64 kbps. The quartering of the data rate, to increase the distance over which the DDS data stream may be transported, operates as a trade-off against loop loss, while still complying with ANSI standards.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of extending a transmission distance for dataphone digital services DDS communications over a four-wire, repeaterless transmission path between a first site and a second site having an effective allowable maximum length defined by communications industry standards, comprising the steps of:

(a) demultiplexing DDS signals into quarter-rate ISDN channels that are transported over said four-wire transmission path between said first and second sites;

(b) processing prescribed contents of said quarter-rate ISDN channels transported over said four-wire transmission path to determine differential transport delay between different portions of said four-wire transmission path;

(c) conveying information representative of the differential transport delay determined in step (b) in a non bearer channel portion of one of said quarter-rate ISDN channels; and (d) controllably delaying faster quarter-rate ISDN channels, so as achieve time alignment for multiplexing said quarter-rate ISDN channels back into an output signal.

2. The method according to claim 1, wherein step (b) comprises processing framing structures of said quarter-rate ISDN channels transported over said four-wire transmission path to determine said differential transport delay.

3. The method according to claim 2, wherein step (d) is carried out at each of said first and second sites.

4. The method according to claim 2, wherein step (d) is carried out at only one of said first and second sites.

5. The method according to claim 1, wherein step (a) further includes conveying information in at least one of a signalling channel and an out-of-band maintenance channel of one of said quarter-rate ISDN channels, said information marking said one of said quarter-rate ISDN channels with information that allows step (b) to determine differential transport delay between said different portions of said quarter-rate four wire transmission path independent of connections of said four-wire transmission path to said first and second sites.

6. The method according to (claim 1, wherein said DDS signals are associated with a prescribed time slot of time division multiplexed T-carrier signals.

7. The method according to claim 1, wherein step (d) comprises receiving, at said second site, said quarter-rate ISDN channels transported over said four-wire transmission path, and transforming said quarter-rate ISDN channels received at said second site into an alternate mark inversion AMI output signal.

8. The method according to claim 7, wherein step (d) comprises converting said quarter-rate ISDN channels into digitally formatted signals, multiplexing said digitally formatted signals into a single digital data signal and converting said single digital data signal into said alternate mark inversion AMI output signal.

9. A system for extending a transmission distance for dataphone digital services DDS communications over a repeaterless, four-wire transmission path having a distance that exceeds an effective allowable maximum length defined by prescribed industry performance standards, said four-wire transmission path connecting said first site and said second site, said system comprising:
at said first site, a first transceiver unit, which is operative to demultiplex a DDS data stream supplied thereto from a T-carrier interface into quarter-rate ISDN communication channels, and to transmit said quarter-rate ISDN communication channels over said four-wire transmission path, such that framing structure of one of said quarter-rate ISDN channels has a prescribed lead time relative to framing structure of another of said quarter-rate ISDN channels; and
at said second site, a second transceiver unit, which includes a received quarter-rate ISDN channel framing structure differential delay measurement device that measures the differential delay between framing structures of selected ones of said quarter-rate ISDN channels, respectively transmitted over different portions of said four-wire transmission path to said second site, and a demultiplexer which demultiplexes digital signals supplied by a signalling link to said second site, into further quarter-rate ISDN communication channels, and is operative to transmit said further quarter-rate ISDN communication channels over said four-wire transmission path from said second site to said first site, and to transmit, in at least one of a further signalling channel and a further out-of-band maintenance channel portion of one of said further quarter-rate ISDN channels, first information representative of said measure of differential transport delay between said different portions of said four-wire transmission path.

10. The system according to claim 9, wherein said first transceiver unit at said first site is operative to extract said first information from said at least one further signalling channel and said further out-of-band maintenance channel portion of one of said further quarter-rate ISDN channels, and to control relative delays between selected ones of said further quarter-rate ISDN channels in accordance with said extracted first information, so as to effectively compensate for said differential transport delay between said different portions of four-wire transmission path.

11. The system according to claim 10, wherein said second transceiver unit further includes a framing structure measurement device which is operative to measure the differential delay between framing structures of said further quarter-rate ISDN channels, and wherein said demultiplexer of said second transceiver is operative to transmit, in said at least one of said further signalling channel and said further out-of-band maintenance channel portion of one of said further quarter-rate ISDN channels, second information representative of the measured differential delay between framing structures of said further quarter-rate ISDN channels.

12. The arrangement according to claim 11, wherein said first transceiver unit further includes a quarter-rate ISDN channel framing structure differential delay measurement device, which is operative to measure the differential delay between framing structures of said further quarter-rate ISDN channels, and a comparator, which compares said framing structure differential delay between said further quarter-rate ISDN channels as measured by said quarter-rate ISDN channel framing structure differential delay measurement device with said second information, that has been inserted into said at least one of said further signalling channel and said further out-of-band maintenance channel portion of one of said further quarter-rate ISDN channels, so as to derive a measure of the differential transport delay between different portions of said four-wire transmission path from said second site to said first site, and
wherein said first transceiver unit includes a multiplexer, which is operative to multiplex said further quarter-rate ISDN communication channels into a further DDS digital data stream to said T-carrier interface, in such a manner as to compensate for said measure of the differential transport delay between said different portions of said four-wire transmission path from said second site to said first site.

13. The system according to claim 12, wherein said first transceiver unit further includes a first site delay device, which is operative to delay faster ones of said further quarter-rate ISDN channels received at said first site, in accordance with said measure of said differential transport delay between different portions of said four-wire transmission path from said second site to said first site, and wherein said multiplexer of said first transceiver unit is operative to multiplex said further quarter-rate ISDN communication channels into said further DDS digital data stream to said T-carrier interface.

14. The system according to claim 9, wherein said first transceiver unit is operative to insert information into at least one of a selected signalling channel and a selected out-of-band maintenance channel portion of a selected quarter-rate ISDN channel that marks said selected quarter-rate ISDN channel with information, that allows said received quarter-rate ISDN channel framing structure differential delay measurement device to determine differential transport delay between different portions of four-wire transmission path independent of connections of said four-wire transmission path to said first and second sites.

15. The method according to claim 9, wherein said DDS data stream is associated with a prescribed time slot of time division multiplexed T-carrier signals.

16. The method according to claim 9, wherein said second transceiver unit is operative to multiplex said quarter-rate ISDN communication channels into an alternate mark inversion AMI output signal.

17. A system for extending a transmission distance for dataphone digital services DDS communications, which are conducted over a four-wire transmission path between a first site and a second site having a distance that exceeds an effective allowable maximum length defined by communications industry standards, said four-wire transmission path connecting said first and second sites, said system comprising:
a first transceiver unit at said first site and being operative to demultiplex DDS signals into quarter-rate ISDN channels that are transported over said four-wire transmission path to said second site;
a second transceiver unit at said second site which receives said quarter-rate ISDN channels; and a delay processor at said second site and being operative to process prescribed contents of said quarter-rate ISDN channels received by said second transceiver unit from said four-wire transmission path to determine differential transport delay between different portions of said four-wire transmission path; and wherein said second transceiver unit is operative to convey information representative of the differential transport delay determined by said delay processor in at least one of a signalling channel and an out-of-band maintenance channel of one of said quarter-rate ISDN channels conveyed over four-wire transmission path to said first transceiver unit; and said first transceiver unit is operative to delay faster quarter-rate ISDN channels over said four-wire transmission path, so as achieve time alignment for enabling said second transceiver unit to multiplex said quarter-rate ISDN channels into an output signal.

18. The system according to claim 17, wherein said delay processor is operative to process framing structures of said quarter-rate ISDN channels transported over said four-wire transmission path to determine said differential transport delay.

19. The system according to claim 18, wherein said first transceiver unit is operative to convey information in at least one of a signalling channel and an out-of-band maintenance channel portion of said one of said quarter-rate ISDN channels, thereby channels marking said one of said quarter-rate ISDN channels with information representative of differential transport delay independent of connections of said four-wire transmission path to said first and second sites.

20. The system according to claim 17, wherein said DDS signals are associated with a prescribed time slot of time division multiplexed T-carrier signals.

21. The system according to claim 17, wherein said second transceiver is operative to process said quarter-rate ISDN channels transported over said four-wire transmission path into an alternate mark inversion AMI output signal.

22. The system according to claim 17, wherein said second transceiver is operative to convert said quarter-rate ISDN communication channels into digitally formatted signals, and including a multiplexer which multiplexes said digitally formatted signals into a single digital data signal, and a signal format conversion unit converts said single digital data signal into an alternate mark inversion AMI output signal.

* * * * *